United States Patent [19]

Preisegger

[11] Patent Number: 4,583,985
[45] Date of Patent: Apr. 22, 1986

[54] PROCESS FOR THE RECOVERY OF SOLVENTS IN THE TREATMENT OF TEXTILES

[75] Inventor: Ewald Preisegger, Nauheim, Fed. Rep. of Germany

[73] Assignee: Hoechst Aktiengesellschaft, Fed. Rep. of Germany

[21] Appl. No.: 625,455

[22] Filed: Jun. 28, 1984

[30] Foreign Application Priority Data

Jul. 1, 1983 [DE] Fed. Rep. of Germany ....... 3323727

[51] Int. Cl.$^4$ .............................................. D06L 1/00
[52] U.S. Cl. .......................................... 8/137; 8/141; 8/142; 34/10; 34/11; 34/12; 502/34; 502/416
[58] Field of Search ............... 8/141, 142, 137; 34/10, 34/11, 12; 502/34, 416

[56] References Cited

U.S. PATENT DOCUMENTS

| | | | |
|---|---|---|---|
| 2,910,137 | 10/1959 | Victor | 8/141 |
| 3,070,463 | 12/1962 | Barday | 134/11 |
| 3,807,948 | 4/1974 | Moore | 8/142 |

Primary Examiner—Robert A. Wax
Attorney, Agent, or Firm—Connolly and Hutz

[57] ABSTRACT

In this process the organic solvents which are obtained in a liquid state in the drying phase are pumped away. The solvents present in the form of a solvent vapor/air mixture are partially condensed by cooling and the fractions of solvent still remaining in vapor form are adsorbed by active charcoal. These adsorbed solvents are recovered by setting up a saturation partial pressure of the solvent in the solvent vapor/air mixture of not more than 0.25 bar. The fractions of solvent adsorbed in the active charcoal are desorbed by means of a solvent vapor/air mixture of the same concentration as in the adsorption process and at temperatures of approx. 100° to 150° C.

2 Claims, 1 Drawing Figure

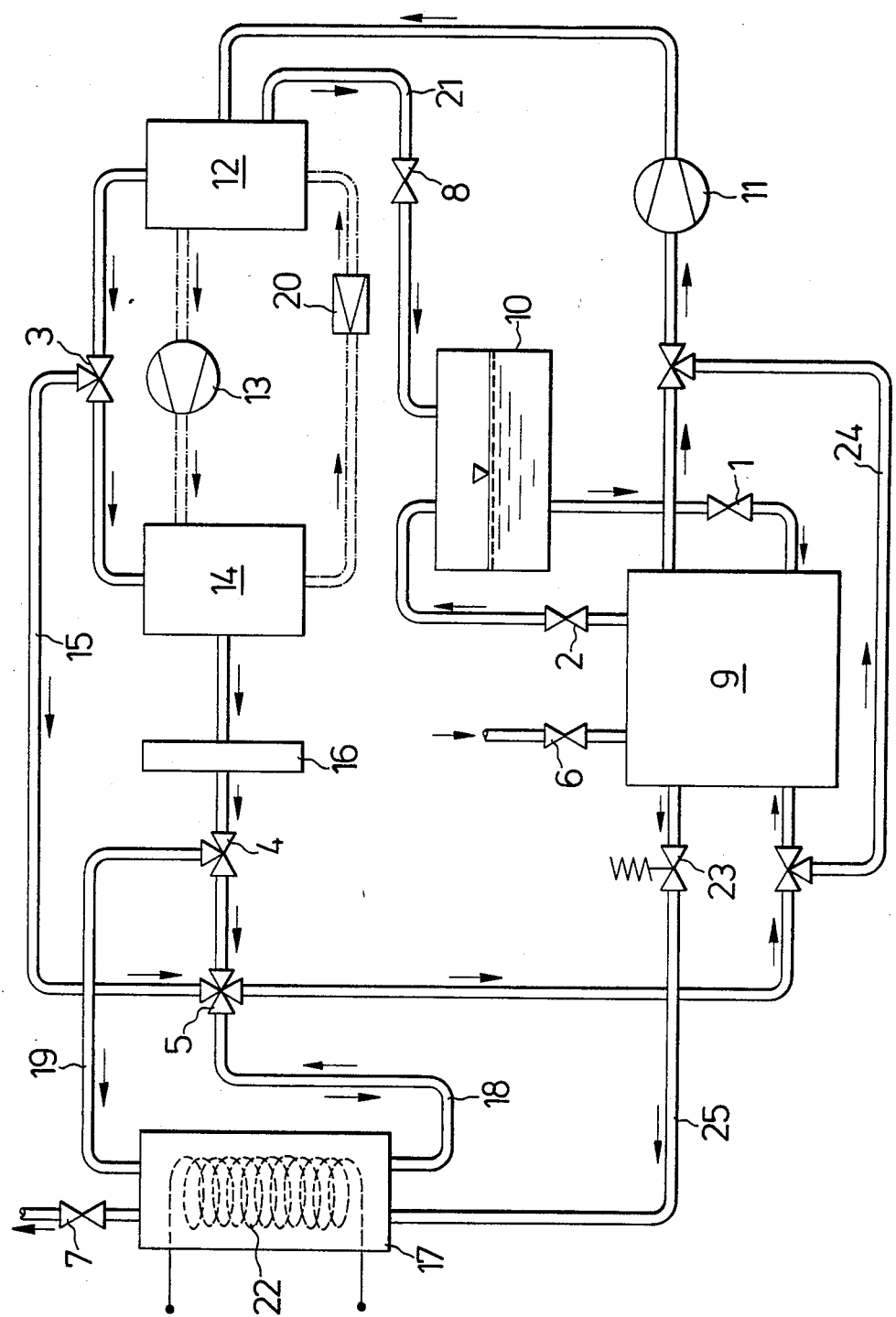

PROCESS FOR THE RECOVERY OF SOLVENTS IN THE TREATMENT OF TEXTILES

The invention relates to a process for the recovery of solvents in the cleaning of textiles using organic solvents, which are obtained in the drying phase and which are present in the form of an air/solvent vapor mixture after the liquid components have been pumped away and which are partially condensed out by cooling, the portions of solvent still remaining in the vapor state being subsequently adsorbed by active charcoal.

Solvent vapors produced in imparting a finish to textiles can also be recovered by this process.

Nowadays organic solvents such as trichlorofluoromethane (FKW 11), trichlorotrifluoroethane (FKW 113), perchloroethylene or methylene chloride are mainly used in the cleaning of textiles.

In the cleaning of textiles, these organic solvents must be recovered during the drying phase, in order to avoid losses of solvent and environmental pollution associated therewith. Various processes are known for the recovery of the solvents during the drying phase of the textiles which have been cleaned. Thus the FKW 113 vapor/air mixture from the drum space of the cleaning installation is circulated to the extent of about 50%, via a blower, over the vaporizer of a refrigerating unit, in the course of which a concentration of residual vapor corresponding to the saturation partial pressure of FKW 113 at the temperature of the mixture at the outlet of the vaporizer is set up. The remaining 50% of the vapor/air mixture are heated in the by-pass by means of an electric resistance heater and are recycled to the cleaning drum. Since the concentration and hence also the density of the FKW 113 vapor/air mixture in the plant varies as a result of the temperature changes, it is necessary to provide a device for equalizing the pressure. The effect of this device is to suck in air or to blow out an FKW 113 vapor/air mixture again in the particular phases. An active charcoal filter for holding back the FKW 113 vapors is provided in this balancing line.

In the drying of textiles, the perchloroethylene/air mixture is passed over a simple heat exchanger charged with cooling water. In the case of the so-called "closed Per machine", the whole volume stream of the recirculated perchloroethylene vapor/air mixture is passed over the vaporizer of a refrigerating unit. In this process too, active charcoal filters are installed in the pressure balancing line.

In the process sequences in FKW 113 machines and perchloroethylene machines, after the textiles have been dried, a solvent concentration is set up in the cleaning drum which corresponds to the saturation pressure of the particular solvent at the temperature at which the solvent vapor/air mixture leaves the vaporizer. Appropriate losses of solvent are thus unavoidable when the charging door is opened and when the drum is unloaded. The solvent held in the active charcoal must also be considered as a loss.

When FKW 11 is used as the solvent, the textiles are dried with a stream of FKW 11 vapor heated to approx. 50° to 60° C., and the FKW 11 vapor is deposited on the vaporizer of a refrigerating unit having a vaporization temperature of approx. −20° C. (corresponding to a deposition temperature of approx. −5° C.). The cleaning drum is then evacuated; in the course of this there is further deposition of FKW 11 vapor on the vaporizer of the refrigerating unit and the cleaning drum is ventilated with fresh air. The proportion of FKW 11 which still remains in the drum and in the textiles after the cleaning drum is evacuated, must be regarded as a loss in this process. In addition, it has been found that the evacuation is relatively susceptible to trouble and results in occasional breakdowns of the cleaning plant.

Solvent losses of 400 to 500 g per cleaning charge cannot be avoided in the known processes. To this must be added an expensive evacuation if FKW 11 is used.

The invention is therefore based on the object of providing a process which enables the losses of solvent to be reduced considerably and which makes the expensive evacuation unnecessary.

The object is achieved by means of the process of the type described which comprises setting up a saturation partial pressure of the solvent in the solvent vapor/air mixture of not more than 0.25 bar, preferably 0.05 to 0.2 bar, and desorbing the fractions of solvent adsorbed in the active charcoal by means of a solvent vapor/air mixture of the same concentration as in the adsorption process and at temperatures of approx. 100° to 150° C.

For easier understanding, the process according to the invention is described on the basis of a modified commercially available cleaning plant, such as is shown in the Figure.

When the cleaning cycle is completed and the solvent has been centrifuged off and pumped away to the stock tank 10, the textiles present in the cleaning drum 9 are dried. For this purpose the valves 1 and 2 are initially shut and valves 6 and 8 remain shut. Drying is carried out with a solvent vapor/air mixture which is circulated in a closed cycle by means of a blower 11. The circulation comprises the cleaning drum 9, the blower 11, the vaporizer 12, the valve 3, the liquefier 14, the heat regulator 16, the valves 4 and 5 and the cleaning drum 9.

The refrigerating unit is then switched on; this comprises the vaporizer 12, the compressor 13, the liquefier 14 and the expansion valve 20. Its performance is regulated so that a saturation partial pressure of the solvent in the solvent vapor/air mixture of not more than 0.25 bar, preferably 0.05 to 0.2 bar, is set up during the drying phase. This is achieved not only by means of adequate performance by the compressor, but also by having adequate dimensions for the heat exchange area on the vaporizer 12. The blower 11 sucks solvent vapor/air mixture from the cleaning drum 9 and passes it over the vaporizer 12 of the refrigerating unit, as the result of which a concentration of solvent vapor corresponding to the saturation partial pressure at the temperature at the vaporizer outlet is set up. Excess quantities of solvent are condensed and flow via a line 21, with the valve 8 open, into the stock tank 10. The dehumidified solvent vapor/air mixture now passes via the valve 3 into the liquefier 14 of the refrigerating unit, where it is reheated. The heat regulator 16 raises the temperature of this mixture to approx. 25 to 40 K above the boiling point of the solvent. The heated mixture then passes via the valves 4 and 5 into the cleaning drum 9 once again, where it again takes up solvent vapor. This circulation is then continued until the textiles in the cleaning drum are dried. The output of the blower 11 is then reduced to approx. 25%, valve 8 is shut, the heat regulator 16 is switched off and the valves 3 and 5 are switched over in such a way that the solvent vapor/air mixture, after passing through the vaporizer 12 at a temperature corresponding to the saturation partial pressure of the solvent of not more than 0.25 bar, passes via lines 15 and 18 to an active charcoal filter bed 17. At the same time the valves 6 and 7 are opened. The solvent vapor is adsorbed on the active charcoal, while the solvent-free air is blown out via valve 7. At the same time the cleaning drum 9 is flushed with fresh air, which is sucked in via valve 6. This mode of operation is maintained until the cleaning drum is full of fresh air. When the flushing of the drum with fresh air is terminated, the valves 4 and 5 are switched over in such a way that there is no longer a connection between the active charcoal filter bed 17 and the drying drum 9. The charging door of the cleaning drum 9 can then be opened and the textiles removed.

After new textiles have been introduced, the first step is to regenerate the active charcoal filter bed 17. This is also carried out again in a closed cycle, the flow through the active charcoal filter bed being in the opposite direction to that in the adsorption process. For this procedure, valve 6 is initially shut, valve 8 is opened and the valves 3, 4 and 5 are switched so that the gas can take the route described below:

After the blower 11 and the refrigerating unit have been switched on, air is first sucked in from the cleaning drum 9, cooled in the vaporizer 12 of the refrigerating unit, reheated in the liquefier 14 and heated in the heat regulator 16 to such a point that the air stream at the outlet reaches a temperature of approx. 100° to 150° C. This hot stream of air is then passed via line 19 to the previously heated active charcoal filter bed 17, as a result of which adsorbed solvent is desorbed again and discharged with the stream of air via line 18. In some cases it is sufficient merely to heat the active charcoal bed. In the course of further passes the concentration of solvent vapor in the circulating gas stream increases. Solvent is condensed in the vaporizer 12. Finally, an equilibrium is set up corresponding to the saturation partial pressure of the temperature prevailing at the outlet of the vaporizer 12. Valve 7 remains shut during this process. This mode of operation is continued until a new equilibrium loading of the active charcoal filter bed 17 has been reached, corresponding to a proportion of solvent vapor of not more than 20% by volume in the air blown through at a temperature of approx. 150° C. When this condition has been reached, the heating 22 of the active charcoal filter bed 17 is switched off; at the same time the valves 4 and 5 are switched so that there is no longer a connection between the active charcoal filter bed and the cleaning drum 9. The blower 11 is switched off, valve 8 is shut and the valves 1 and 2 are opened. The cleaning drum 9 can then be flooded with solvent and the cleaning cycle can begin.

The excess pressure built up when the solvent in the drum is heated to 20° to 25° C. can be released (with valve 7 open) via a pressure relief valve 23 (set to approx. 1.4 bar absolute) and the line 25 into the active charcoal filter, which has already been regenerated.

If the desorption is to be carried out at the same time as another section of charge, the drum space can be bypassed via a line 24 which must be installed additionally.

I claim:

1. A process for the recovery of solvents in the cleaning of textiles using organic solvents and in the imparting of finishes to textiles, which solvents are obtained in the drying phase and which are present in the form of a solvent vapor/air mixture after the liquid components have been pumped away and which are partially condensed out by cooling, the portions of solvent still remaining in the vapor state being subsequently adsorbed by active charcoal, wherein a saturation partial pressure of the solvent in the solvent vapor/air mixture of not more than 0.25 bar is set up and the fractions of solvent adsorbed in the active charcoal are desorbed by means of a solvent vapor/air mixture of the same concentration as in the adsorption process and at temperatures of approx. 100° to 150° C.

2. A process as in claim 1 wherein the saturation partial pressure of the solvent in the solvent vapor/air mixture is 0.05 to 0.2 bar.

* * * * *